(12) United States Patent
Takenaga

(10) Patent No.: US 6,879,908 B2
(45) Date of Patent: Apr. 12, 2005

(54) COMMUNICATION NAVIGATION SYSTEM, COMMUNICATION NAVIGATION METHOD, ROUTE GUIDANCE INFORMATION TRANSMITTING DEVICE, AND TERMINAL UNIT

(75) Inventor: Takashi Takenaga, Tokyo-to (JP)

(73) Assignees: Pioneer Corporation, Tokyo-To (JP); Increment P Corporation, Tokyo-To (JP)

( * ) Notice: Subject to any disclaimer, the term of this patent is extended or adjusted under 35 U.S.C. 154(b) by 0 days.

(21) Appl. No.: 10/264,342

(22) Filed: Oct. 4, 2002

(65) Prior Publication Data
US 2003/0109983 A1 Jun. 12, 2003

(30) Foreign Application Priority Data
Oct. 5, 2001 (JP) .................................... P2001-309496

(51) Int. Cl.[7] ..................... G01C 21/34; G01C 21/30; G01C 21/26
(52) U.S. Cl. ...................... 701/202; 701/211; 340/990
(58) Field of Search ................................. 701/202, 211, 701/209, 210, 212, 200, 201, 207, 208; 340/990, 905, 988, 995.1; 342/463; 73/178 R

(56) References Cited

U.S. PATENT DOCUMENTS 6,278,941 B1    8/2001  Yokoyama
6,317,684 B1 *  11/2001 Roeseler et al. ............. 701/202
6,334,089 B1 *  12/2001 Hessing ....................... 701/209
6,421,602 B1 *   7/2002 Bullock et al. ............. 701/201
6,484,093 B1 *  11/2002 Ito et al. ..................... 701/211
2001/0019309 A1  9/2001 Saeki et al.

FOREIGN PATENT DOCUMENTS

| EP | 0 994 449 A2 | 4/2000 |
|----|--------------|--------|
| EP | 1 096 232 A2 | 5/2001 |
| EP | 1 102 228 A2 | 5/2001 |

* cited by examiner

Primary Examiner—Tan Q. Nguyen
Assistant Examiner—Dalena Tran
(74) Attorney, Agent, or Firm—Sughrue Mion, PLLC

(57) ABSTRACT

A communication navigation method comprises a first procedure in which a terminal unit requests a server to transmit an information segment necessary for a first current part of guidance via the Internet, a second procedure in which the server transmits to the terminal unit the information segment requested by the first procedure, via the Internet, a third procedure in which after the second procedure, the terminal unit requests the server to transmit an information segment necessary for a second current part of the guidance via the Internet, and a fourth procedure in which the server transmits to the terminal unit the information segment requested by the third procedure, via the Internet. The information segment transmitted by the fourth procedure is an update of the information segment transmitted by the second procedure.

21 Claims, 6 Drawing Sheets

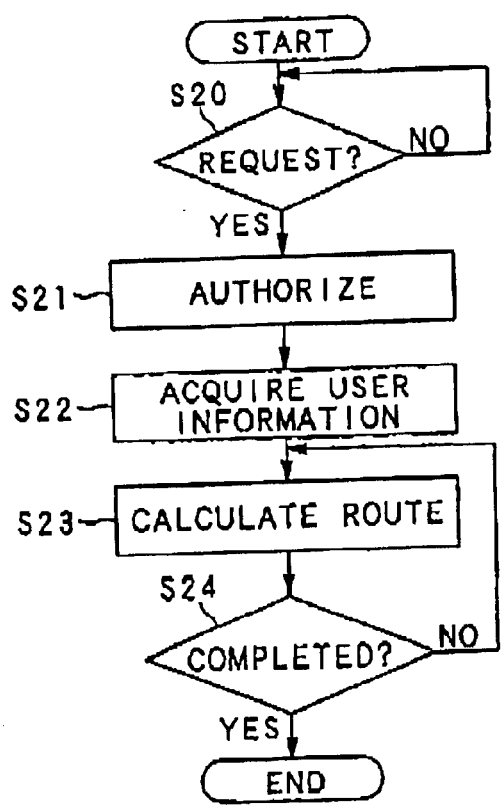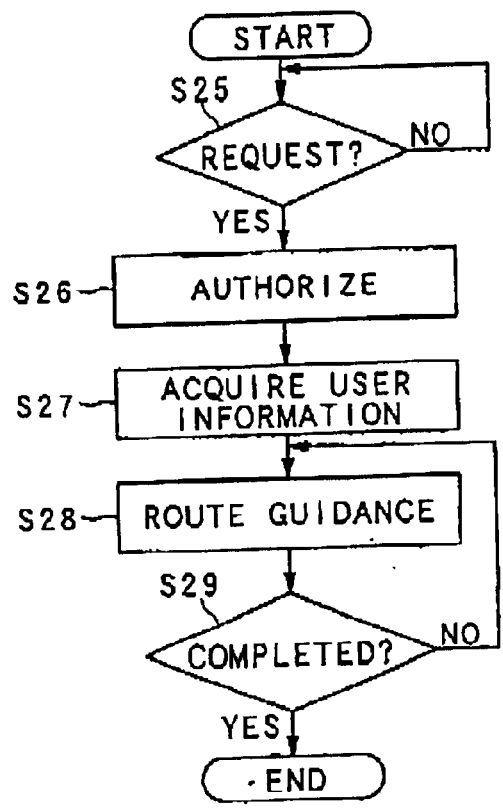

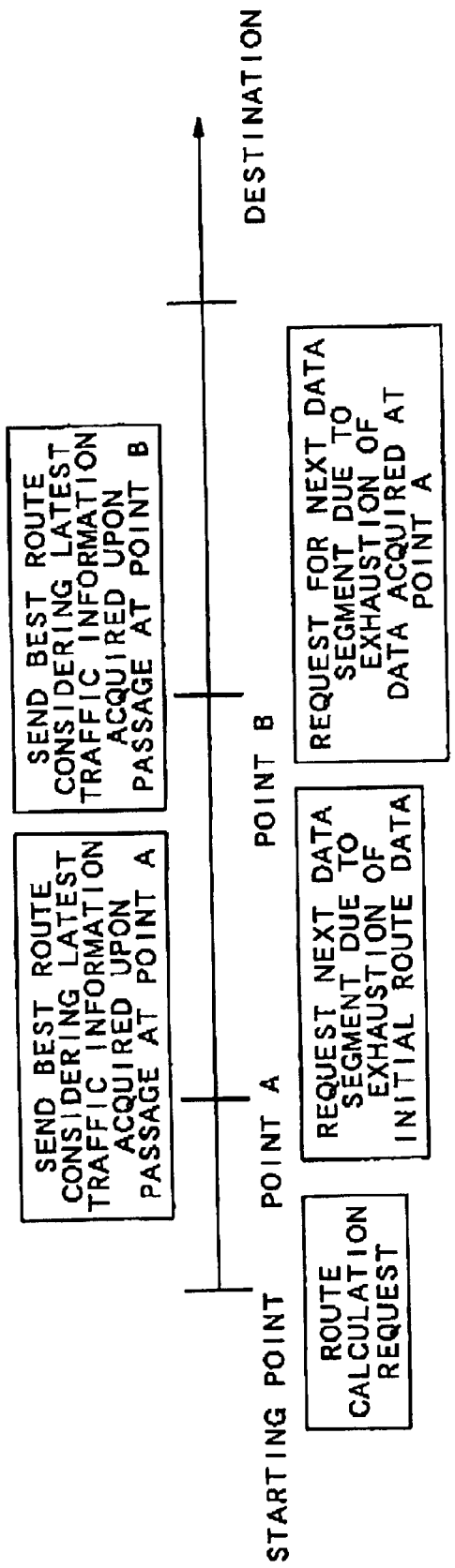

COMMUNICATION NAVIGATION SYSTEM, COMMUNICATION NAVIGATION METHOD, ROUTE GUIDANCE INFORMATION TRANSMITTING DEVICE, AND TERMINAL UNIT

BACKGROUND OF THE INVENTION

1. Field of the Invention

The present invention relates to communication navigation systems and methods, etc. for performing navigation by transmitting map data to navigation terminals via a communication network. More particularly, the invention is directed to a communication navigation system and method, etc. which can present the latest information with navigation terminals.

2. Description of Related Art

Various types of navigation systems have been proposed, which perform navigation by transmitting map data stored in a server and route guidance information, via computer and mobile communications networks including the Internet, to various types of navigation terminals, such as in-vehicle navigation units, portable navigation units, PDAs (Personal Digital Assistants) and cellular telephones, according to their request. Each of these navigation terminals presents a user with predetermined information visibly and audibly, based on position data detected by a GPS (Global Positioning System) receiver mounted thereon as well as map data transmitted from the server, to guide the user to his or her destination.

In the above communication navigation systems, the server, receiving a request for guidance to a destination from a navigation terminal disposed on a vehicle, calculates the best route, etc. for a total route from a starting point to the destination, and transmits to the navigation terminal the calculated data, etc. en bloc.

However, when the vehicle is heading for a remote destination, and thus needs guidance for a long-distance route, a memory of the navigation terminal may, in some cases, be too small to receive all the calculated data, etc. transmitted from the server. In such cases, the navigation terminal cannot receive new data any longer, and hence cannot update the best route, etc. according to the latest traffic information, etc.

SUMMARY OF THE INVENTION

To solve the above problem, the present invention provides a communication navigation method and system, etc. capable of appropriately reflecting the latest information while keeping the storage capacity of a terminal unit low.

The above object of the present invention can be achieved by a communication navigation method for performing navigation, using map data stored in a server and current position data about a navigation terminal, by transmitting the map data to the navigation terminal via a communication network. The communication navigation method is provided with: a first procedure in which the navigation terminal requests the server to transmit an information segment necessary for a first current part of guidance via the communication network; a second procedure in which the server transmits to the navigation terminal the information segment requested by the first procedure, via the communication network; a third procedure in which after the second procedure, the navigation terminal requests the server to transmit an information segment necessary for a second current part of the guidance via the communication network; and a fourth procedure in which the server transmits to the navigation terminal the information segment requested by the third procedure, via the communication network. In addition, the information segment transmitted by the fourth procedure is an update of the information segment transmitted by the second procedure.

According to the present invention, the server transmits to the navigation terminal the information necessary for guidance in segments, whereby the navigation terminal, receiving the information on a segment basis, can reduce the storage capacity of its memory. Additionally, the updated information is transmitted, to allow the navigation terminal to acquire information reflecting the latest road conditions, etc.

Each of the information segments may be route information indicative of a route.

In this case, the best route information can be obtained based on the latest traffic conditions.

Each of the information segments may be guidance information used for the guidance.

In this case, the best guidance information can be obtained based on the latest traffic conditions.

The above object of the present invention can be achieved by a communication navigation system of the present invention for implementing a communication navigation method for performing navigation, using map data stored in a server and current position data about a navigation terminal, by transmitting the map data to the navigation terminal via a communication network. The communication navigation method is provided with: a first procedure in which the navigation terminal requests the server to transmit an information segment necessary for a first current part of guidance via the communication network; a second procedure in which the server transmits to the navigation terminal the information segment requested by the first procedure, via the communication network; a third procedure in which after the second procedure, the navigation terminal requests the server to transmit an information segment necessary for a second current part of the guidance via the communication network; and a fourth procedure in which the server transmits to the navigation terminal the information segment requested by the third procedure, via the communication network. In addition, the information segment transmitted by the fourth procedure is an update of the information segment transmitted by the second procedure.

According to the present invention, the server transmits to the navigation terminal the information necessary for guidance in segments, whereby the navigation terminal, receiving the information on a segment basis, can reduce the storage capacity of its memory. Additionally, the updated information is transmitted, to allow the navigation terminal to acquire information reflecting the latest road conditions, etc.

Each of the information segments may be route information indicative of a route.

In this case, the best route information can be obtained based on the latest traffic conditions.

Each of the information segments may be guidance information used for the guidance.

In this case, the best guidance information can be obtained based on the latest traffic conditions.

The above object of the present invention can be achieved by a terminal unit of the present invention that implements a communication navigation method for performing navigation, using map data stored in a server and current position data about a navigation terminal, by transmitting the map data to the navigation terminal via a communication network, as the navigation terminal. The communication navigation method is provided with: a first procedure in which the navigation terminal requests the server to transmit an information segment necessary for a first current part of guidance via the communication network; a second procedure in which the server transmits to the navigation terminal the information segment requested by the first procedure, via the communication network; a third procedure in which after the second procedure, the navigation terminal requests the server to transmit an information segment necessary for a second current part of the guidance via the communication network; and a fourth procedure in which the server transmits to the navigation terminal the information segment requested by the third procedure, via the communication network. In addition, the information segment transmitted by the fourth procedure is an update of the information segment transmitted by the second procedure.

According to the present invention, the server transmits to the navigation terminal the information necessary for guidance in segments, whereby the navigation terminal, receiving the information on a segment basis, can reduce the storage capacity of its memory. Additionally, the updated information is transmitted, to allow the navigation terminal to acquire information reflecting the latest road conditions, etc.

Each of the information segments may be route information indicative of a route.

In this case, the best route information can be obtained based on the latest traffic conditions.

Each of the information segments may be guidance information used for the guidance.

In this case, the best guidance information can be obtained based on the latest traffic conditions.

BRIEF DESCRIPTION OF THE DRAWINGS

FIG. 3A is a flowchart showing a route calculation process according to the embodiment;

FIG. 3B is a flowchart showing a route guidance process according to the embodiment;

FIG. 6 is a flowchart showing a segmented processing according to the embodiment.

DETAILED DESCRIPTION OF THE PREFERRED EMBODIMENT

A preferred embodiment of the present invention will now be described with reference to the drawings. In the following description, the preferred embodiment refers to a case where the invention is applied to a navigation system which includes terminal units mounted on vehicles, a server connected to the terminal units via a network such as the Internet, and the network, and which assists in driving the vehicles.

General configuration and operation

Referring to FIGS. 1 to 4, the general configuration and operation of the navigation system according to this embodiment will be described.

Figure 1A:
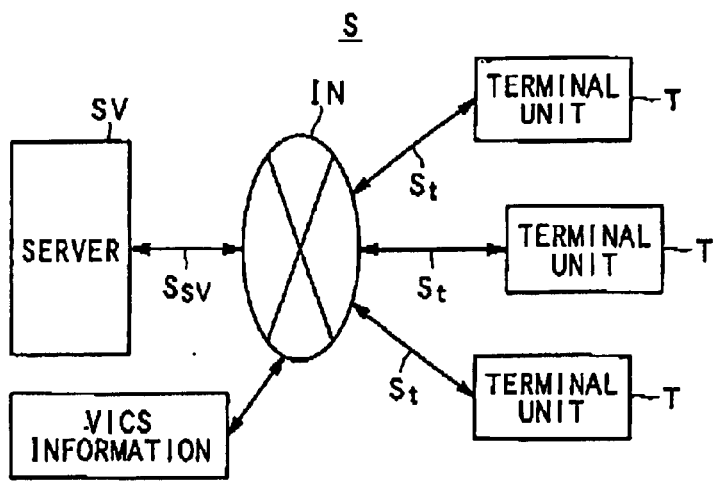
FIG. 1A is a block diagram showing the general configuration of a navigation system according to an embodiment of the invention.

As shown in FIG. 1A, the navigation system S according to this embodiment is provided with terminal units T, and a server SV. Each terminal unit T sends to the server SV a terminal signal St indicative of information such as vehicle's current position and travelling direction, as well as a request for information to be presented to a driver, and also receives from the server SV a terminal signal St indicative of various navigation process information corresponding to the request, and presents the requested information to the driver. Upon receipt of the terminal signal St as a server signal Ssv, the server SV searches for map information, etc. to be presented to the driver on the terminal unit T and performs processes (described below) including a route guidance process for his or her vehicle on which the terminal unit T is mounted, based on the received server signal Ssv, and then sends the processed results as a server signal Ssv to the terminal unit T. The terminal unit T and the server SV communicate with each other via the Internet IN.

The server SV can obtain VICS information via the Internet.

As shown in FIG. 1A, one sever SV is connected to a plurality of terminal units T so that the server SV can send to the terminal units T map and other information on a time division basis.

Figure 1B:
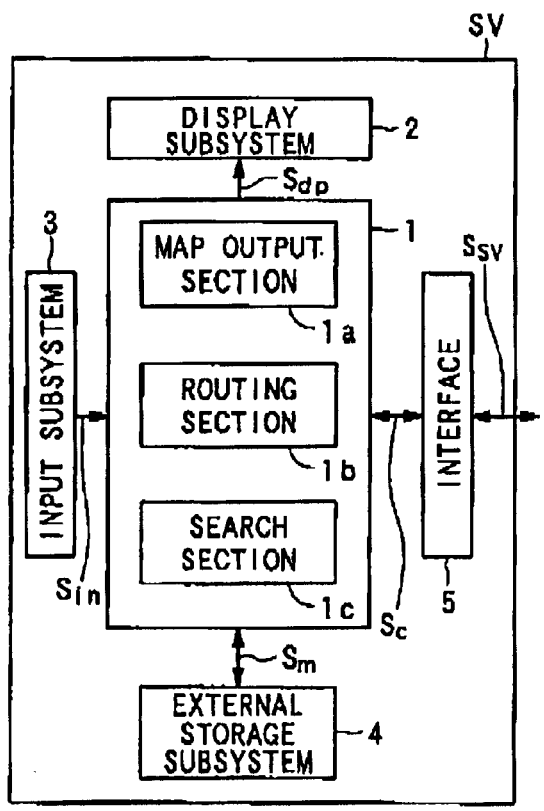
FIG. 1B is a block diagram showing a detailed configuration of a server according to the embodiment.
Figure 1C:
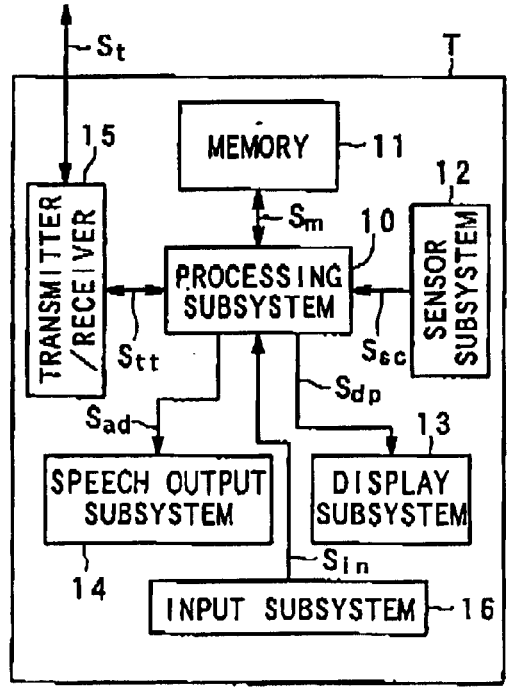
FIG. 1C is a block diagram showing a detailed configuration of a terminal unit according to the embodiment.

Referring next to FIGS. 1B and 1C, the detailed configuration of the navigation system S will be described.

As shown in FIG. 1B, the server SV comprises a CPU 1, a display subsystem 2, an input subsystem 3, an external storage subsystem 4 such as a hard drive, and an interface 5.

In the above configuration, the interface 5 appropriately interfaces an input server signal Ssv from the Internet IN to output the signal Ssv to the CPU 1 as a to-be-processed server signal Sssv, and also appropriately interfaces a processed server signal Sssv from the CPU 1 to output the signal Sssv to a terminal unit T as a server signal Ssv via the Internet IN.

The external storage subsystem 4 stores all information requisite for a navigation process performed by the navigation system S according to this embodiment, and outputs such information to the CPU 1 as a memory signal Sm, as needed. The information includes map information for display on each terminal unit T, various information used for a routing process (described below), point information for performing the navigation process according to this embodiment (more specifically, position information about points indicated on a map for display on the terminal unit T and descriptions of these points), and information about a user of the terminal unit T.

The CPU 1 is provided with a map output section 1a, a routing section 1b, and a search section 1c for its processing.

The map output section 1a searches for and reads, based on the request input as the to-be-processed server signal Sssv, map information corresponding to the request from among the map information stored in the external storage subsystem 4 as a memory signal Sm, and outputs the memory signal Sm to the terminal unit T via the interface 5 and the Internet IN as a processed server signal Sssv.

The routing section 1b calculates and finds, based on the request input as the to-be-processed server signal Sssv, a route along which the vehicle should travel, using the map information stored in the external storage subsystem 4, searches and reads the map information including the calculated and found route as a memory signal Sm, and outputs the memory signal Sm to the terminal unit T via the interface 5 and the Internet IN as a processed server signal Sssv.

Concurrently therewith, the routing section 1b generates route guidance information for guiding the vehicle having the terminal unit T aboard to move along the searched route, and outputs the searched result to the terminal unit T via the interface 5 and the Internet IN as a processed server signal Sssv.

The search section 1c searches for and reads, as a memory signal Sm, the point information, etc. stored in the external storage subsystem 4 based on the request input as the to-be-processed server signal Sssv, and outputs the memory signal Sm to the terminal unit T via the interface 5 and the Internet IN as a processed server signal Sssv.

The input subsystem 3 generates, upon-entry of information necessary for the above operations, an input signal Sin corresponding to the entered information, and outputs the generated input signal Sin to the CPU 1. After having received the signal Sin, the CPU 1 performs its processing accordingly.

Information to be presented to an operator of the server SV during the above operations is output to the display subsystem 2 as a display signal Sdp so that information corresponding to the display signal Sdp is displayed on the display subsystem 2.

Then, as shown in FIG. 1C, a terminal unit T is provided with a processing subsystem 10 including a CPU and a memory, a memory 11, a sensor subsystem 12, a display subsystem 13, a speech output subsystem 14, a transmitter/receiver 15 such as a cellular telephone, and an input subsystem 16.

In this configuration, the transmitter/receiver 15 appropriately interfaces an input terminal signal St from the Internet IN to output a to-be-processed terminal signal Stt to the processing subsystem 10, and similarly interfaces a processed terminal signal Stt from the processing subsystem 10 to output a terminal signal St to the server SV via the Internet IN.

The sensor subsystem 12 is provided with a GPS receiver, a vehicle-speed sensor, and an acceleration sensor, and outputs information indicative of the vehicle's current position and attitude, etc. from the receiver and sensors, to the processing subsystem 10 as a sensor signal Ssc. The GPS receiver outputs absolute position information (absolute geographical latitude and longitude data) about a vehicle carrying the terminal unit T aboard, based on position information contained in GPS radio waves from a GPS satellite in orbit. The vehicle-speed sensor outputs distance and speed information by computing a distance traveled and a vehicle's speed based on so-called vehicle-speed pulses from a front wheel of the vehicle. The acceleration sensor detects turning angles and vertical inclinations of the vehicle to output information about the vehicle's travelling direction.

The input subsystem 16 generates, upon specification of a map for display on the display subsystem 13 or upon specification of a setting for the navigation process according to this embodiment such as a destination, an input signal Sin corresponding to the specification, and outputs the generated input signal Sin to the processing subsystem 10.

Based on these signals Ssc and Sin, the processing subsystem 10 generates information including current position information about the vehicle carrying the terminal unit T aboard, as well as a request, etc. corresponding to the specification made at the input subsystem 16. Then, the processing subsystem 10 outputs such generated information, request, etc. as a to-be-processed terminal signal Stt to the server SV via the transmitter/receiver 15.

Upon receipt of a processed terminal signal Stt via the Internet IN and the transmitter/receiver 15 from the server SV that has processed the to-be-processed signal Stt based on the current position information, request, etc., the processing subsystem 10 outputs the map information contained in the received processed terminal signal Stt to the display subsystem 13 as a display signal Sdp to display the map information thereon. The display subsystem 13 additionally displays information such as map information along the route generated by the routing section 1b within the server SV or routing information based on the route guidance information.

Of the route guidance information, audible messages to be given to the driver of the vehicle is output to the speech output subsystem 14 as an audio signal Sad, to implement the route guidance.

The processing subsystem 10 temporarily stores some information, such as the map information sent from the server SV, in the memory 11 as a memory signal Sm, which is then read, as needed, for proper indicator light processing.

Navigation process

Figure 2:
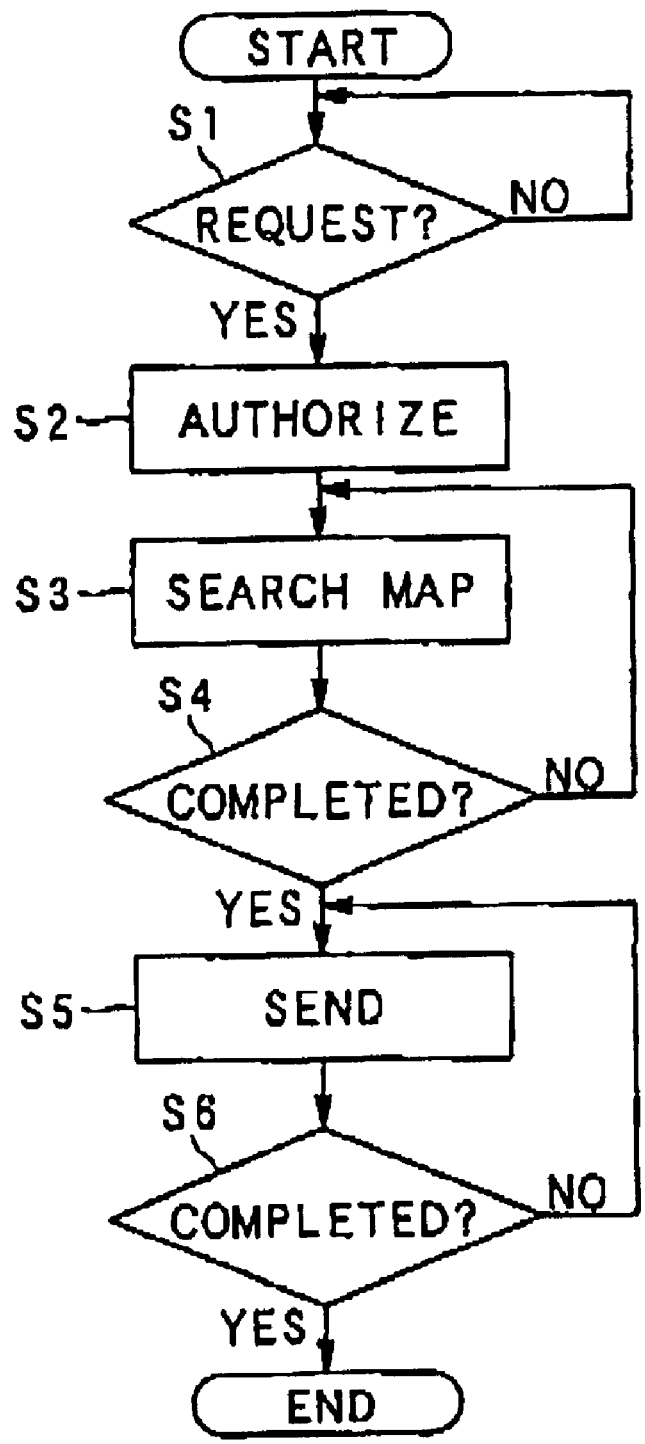
FIG. 2 is a flowchart showing a map search process according to the embodiment.
Figure 4:
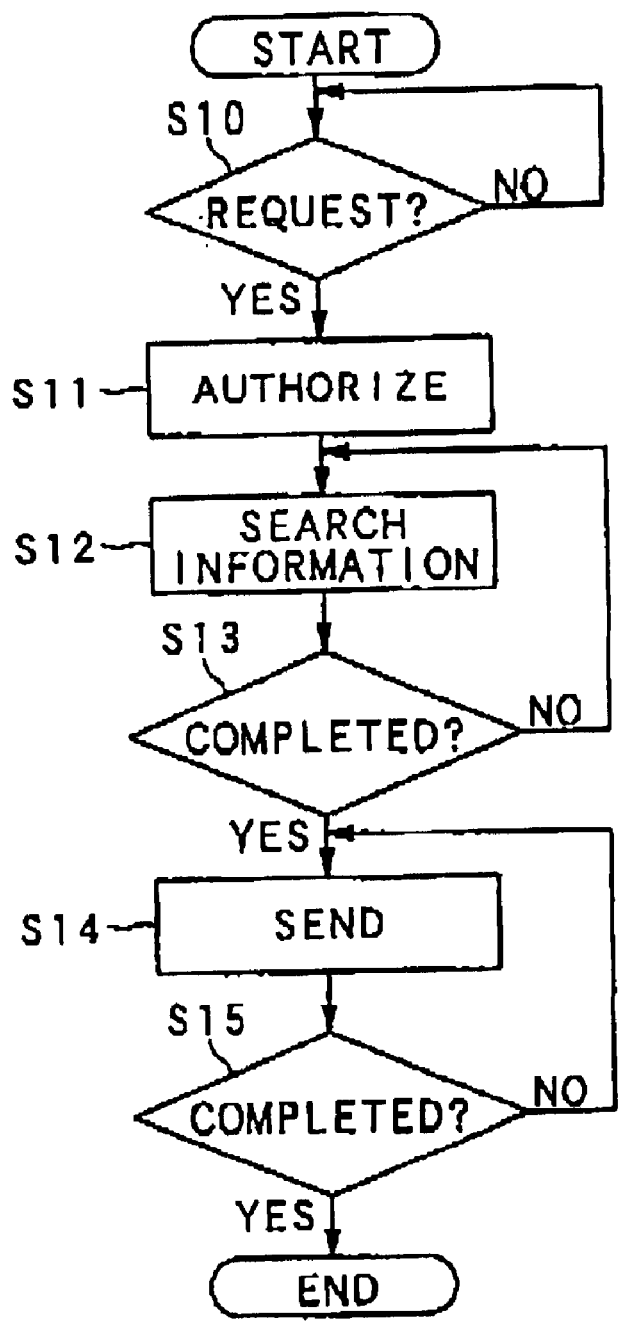
FIG. 4 is a flowchart showing an information search process according to the embodiment.

The navigation process to be performed by the navigation system S having the above configuration will be described. Referring to FIGS. 2 to 4, the description starts with steps taken by the server SV.

Referring to the flowchart shown in FIG. 2, a map search process will be described, in which steps are taken to search a map for display on the display subsystem 13 of any of the terminal units T.

In the map search process, the server SV constantly checks whether or not any terminal unit T sends a request for a map for display (step S1). If not (step S1; NO), the server SV waits. If so (step S1; YES), the server SV determines whether or not the requesting terminal unit T is authorized by the navigation system S according to this embodiment (step S2).

Upon completion of the authorization step, the server SV causes the map output section 1a to search for appropriate map information based on the received request by referring to the map information stored in the external storage subsystem 4 (steps S3 and S4). When the search step S4 is completed (step S4; YES), the searched map information is sent to the terminal unit T (step 5S).

The server SV keeps checking whether or not all of the map information has been sent (step S6). If not (step S6; NO), the server SV continues sending the rest of the information, and if so (step S6; YES), it brings the series of map search steps to an end.

It should be noted that according-to this embodiment, the map information is sent while divided into segments. That is, of the total route along which to guide the vehicle, only a map information segment that is immediately necessary is sent, and this is repeated multiple times until the vehicle reaches the destination. This will be detailed below.

Referring next to the flowchart shown in FIG. 3A, a route calculation process will be described, in which steps are taken to calculate a route along which to guide a vehicle carrying any of the terminal units T thereon.

In the route calculation process, the server SV always checks whether or not a request containing a place of departure, a destination, and routing conditions (more specifically, whether or not highways are preferred, or calculations are to be made so that the vehicle drives along specific roads, etc.) has been sent from any terminal unit T (step S20). If not (step S20; NO), the server SV waits, and if so (step S20; YES), the server SV then determines whether or not that requesting terminal unit T is authorized by the navigation system S according to this embodiment (step S21).

Upon completion of the authorization step, the server SV extracts and acquires user information related to a user who owns the authorized terminal unit T from the external storage subsystem 4 (step S22), and then causes its routing section 1b to perform prescribed route calculation steps based on the destination, etc. contained in the request as well as the acquired user information (steps S23 and S24). When these route calculating steps are completed (step S24; YES), the server SV temporarily loads the calculated route information into the memory within the CPU 1, to terminate the route calculation process. The server SV may send the calculated route information to the terminal unit T so that the unit T causes its display subsystem 13 to display the received route information thereon.

It should be noted that according to this embodiment, the route calculation process is carried out by dividing the route into segments. That is, of the entire route along which to guide the vehicle, route calculations are made only for a route segment that is immediately needed, and this is repeated a plurality of times until the vehicle reaches the destination. This will be further explained below.

Referring then to the flowchart shown in FIG. 3B, a route guidance process will be described, in which steps are taken to guide a vehicle along the calculated route, the vehicle carrying any of the terminal units T aboard.

In the route guidance process, the server SV constantly checks whether or not the terminal unit T has sent a request for starting route guidance (step S25). If not (step 825; NO), the server SV waits, and if so (step S25; YES), it determines whether or not the requesting terminal unit T is authorized by the navigation system S according to this embodiment (step S26).

Upon completion of the authorization step, the server SV extracts and acquires user information related to a user who owns the authorized terminal unit T from the external storage subsystem 4 for confirmation (step S27), and causes its routing section 1b to perform prescribed route guidance steps (steps S28 and S29) according to the request. Upon completion of the route guidance process (step S29; YES), the server SV[]terminates the route guidance process, which includes a step of acquiring current position information indicative of the vehicle's current position, a step of determining whether or not the acquired current position is on the previously calculated route, and a step of calculating the relationship between the vehicle's current position and a point of interest (an intersection for turn, a landmark, or the like) along the route, and sending the calculated relationship to the terminal unit T to inform the driver of the calculated relationship.

It should be noted that according to this embodiment, the route guidance process is carried out by dividing the guidance processing into segments. That is, of the total route along which to guide the vehicle, guidance calculations are performed only for a guidance segment that is currently necessary, and this is repeated multiple times until the vehicle reaches the destination. This will be detailed below.

Referring next to the flowchart shown in FIG. 4, an information search process will be described, in which steps are taken to search information which is to be given to the driver of any of the terminal units T and which is related to the navigation process.

In the information search process, the server SV keeps checking whether or not any terminal unit T has sent a request for information to be given to the driver (step S10). If not (step S10; NO), the server SV waits. If so (step S10; YES), the server SV determines whether or not that requesting terminal unit T is authorized by the navigation system S according to this embodiment (step S11).

Upon completion of the authorization step, the server SV then causes its search section 1c to search for appropriate information from among the information stored in the external storage subsystem 4 based on the received request (steps S12 and S13). When the search is completed (step S13; YES), the server SV sends the searched information to the terminal unit T (step S14).

In the meantime, the server keeps checking whether or not all of the searched information has been sent (step S15). If not (step S15; NO), the server SV continues sending the rest of the information, and if so (step S15; YES), it brings the series of information search steps to an end.

Figure 5:
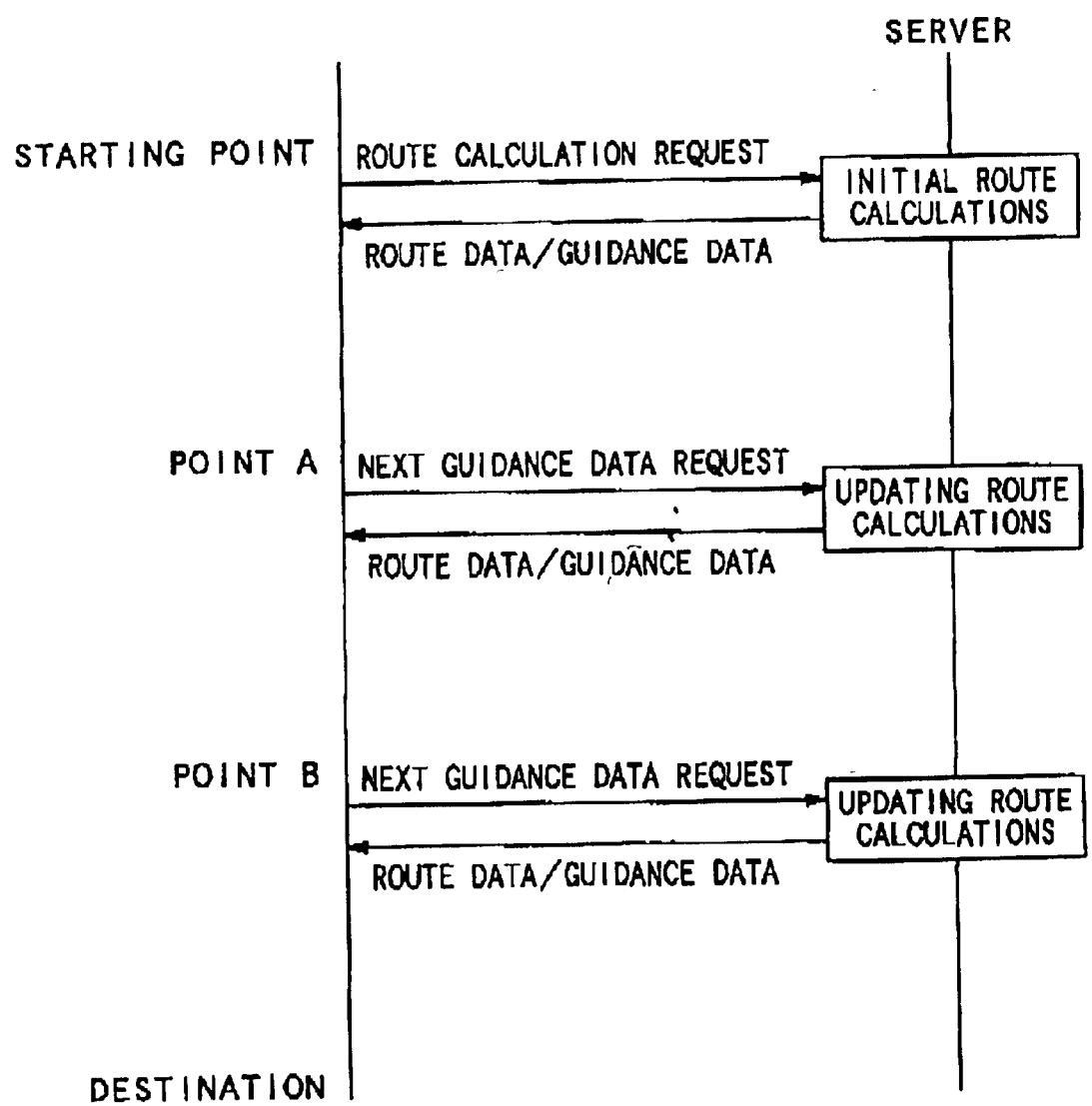
FIG. 5 is a flowchart showing a segmented processing according to the embodiment.

As mentioned above, according to this embodiment, in certain processes of the navigation process, processing is not performed for the total route at once, but is performed by dividing the total route into segments, and only for one processing segment at a time which is immediately necessary. Referring now to FIGS. 5 and 6, such segmented processing will be described.

FIGS. 5 and 6 are flowcharts showing the segmented processing according to this embodiment. As shown in the figures, when a user specifies a destination at a starting point (point of departure), the corresponding terminal unit T sends to the server SV requests for the map search process (FIG. 2), the rout calculation process (FIG. 3A), and the route guidance process (FIG. 3B). In response to the requests, the server SV performs the series of steps shown in FIGS. 2, 3A and 3B, with the respective steps being carried out only for a segment of immediate need for travelling from the starting point. As shown in FIGS. 5 and 6, the server SV makes initial route calculations (FIG. 5), etc., and then sends to the terminal unit T only a route data segment and a guidance data segment which the user currently needs for driving from the starting point.

Then, at a point A shown in FIGS. 5 and 6, when recognizing that the data acquired by the initial route calculations, etc. has been exhausted so that further guidance cannot be given, the terminal unit T sends new requests to the server SV. In response to the new requests, the server SV performs the series of steps shown in FIGS. 2, 3A and 3B once again, with the processing being limited only to a segment currently necessary for travelling from the point A. In addition, the processing such as the route calculations takes into account the latest traffic information acquired upon passage at the point A. The latest traffic information is based on VICS information (FIG. 1) which the server SV has acquired via the Internet IN.

In this way, as shown in FIGS. 5 and 6, the server SV caries out the updating route calculations (FIG. 5), etc., and sends to the terminal unit T updated route data (route calculation results) and guidance data immediately necessary for driving from the point A.

Then, when the vehicle arrives at a point B shown in FIGS. 5 and 6, and when the terminal unit T recognizes that the data acquired by the updating route calculations, etc. at the point A is no longer usable for further guidance, the terminal unit T sends new requests to the server SV. Upon receipt of the new requests, the server SV performs the series of steps shown in FIGS. 2, 3A and 3B once again, with the processing covering only a segment of immediate need for travelling from the point B. In addition, the processing such as the route calculations considers the latest traffic information acquired upon passage at the point B. That is, as shown in FIGS. 5 and 6, the server SV performs the updating route calculations (FIG. 5), etc., and sends to the terminal unit T updated route data (route calculation results) and guidance data immediately required for driving from the point B.

Thus, according to this embodiment, processing is performed by dividing the data necessary for guidance into segments, and only one immediately necessary data segment is processed and sent to the terminal unit T from the server SV every time the terminal unit T requests to do so. Therefore, the terminal unit T can reduce the storage capacity of its memory 11 that stores the data sent from the server SV. Moreover, the server SV sends to the terminal unit the data segments that are updated, and hence the terminal unit T can acquire information reflecting the latest traffic conditions at any time. For example, the user can select the best route always appropriately according to traffic information about accidents, congestions, etc.

The timing for sending new data can be selective. For example, the server SV may send updated data to the terminal unit T at predetermined time intervals (e.g., once every 5 minutes) or before the vehicle gets out of a geographical area covered by any previous guidance data segment. In the latter case, the terminal unit T may determine whether or not it sends new requests based on a relationship between a previously received guidance data segment and a current vehicle position detected by the sensor subsystem 12.

While the above-disclosed embodiment refers to the example in which the server SV carries out route calculations in dependence on requests from the terminal unit T, the server SV may constantly perform route calculations offline without dependence on requests, and sends the latest route calculation results, etc. to the terminal unit T upon receipt of a request.

According to the communication navigation method and system, etc. of the present invention, the server sends to the navigation terminal information necessary for guidance in segments, whereby the navigation terminal can reduce the storage capacity of its memory. Furthermore, since the updated information segment is sent in the fourth procedure, the navigation terminal can acquire information reflecting the latest road conditions, etc.

The entire disclosure of Japanese Patent Application No. 2001-309496 filed on Oct. 5, 2001 including the specification, claims, drawings and summary is incorporated herein by reference in its entirety.

What is claimed is:

1. A communication navigation method for performing navigation, using map data stored in a server and current position data about a navigation terminal, by transmitting the map data to the navigation terminal via a communication network, the communication navigation method comprising:

a requesting process in which the navigation terminal requests the server to transmit an information necessary for an immediate part of guidance via the communication network; and sends a memory capacity of the navigation terminal to the server;

a dividing process in which an information which is searched by the server from a starting point to a destination point specified by a user, is divided into some segments judged by the server according to the terminal memory; and a transmitting process in which the server transmits the requested divided information which is the closest point information to the navigation terminal, to the navigation terminal via the communication network, wherein the requested information is a map data which is updated at the time of the server receiving the navigation terminal requests.

2. The communication navigation method according to claim 1, wherein each of the information segments comprises route information indicative of a route.

3. The communication navigation method according to claim 1, wherein each of the information segments comprises guidance information used to implement the guidance.

4. A communication navigation method for performing navigation, using map data stored in a server and current position data about a navigation terminal, by transmitting the map data to the navigation terminal via a communication network, the communication navigation method comprising:

a first procedure in which the navigation terminal requests the server to transmit an information segment necessary for a first current part of guidance via the communication network and sends a memory capacity of the navigation terminal to the server;

a second procedure in which the server transmits to the navigation terminal the first information segment of the information segments, which are map data from a starting point to a destination point specified by a user and searched by the server, which is divided into some segments judged by the server according to the terminal memory, via the communication network;

a third procedure in which after the second procedure, the navigation terminal requests the server to transmit a next one of the information segment necessary for a second current part of the guidance via the communication network; and a fourth procedure in which the server transmits to the navigation terminal the information segment requested by the third procedure, via the communication, network, wherein the information segment transmitted by the fourth procedure is an update segment of the information segments at the time of the third procedure.

5. The communication navigation system according to claim 4, wherein each of the information segments comprises route information indicative of a route.

6. The communication navigation system according to claim 4, wherein each of the information segments comprises guidance information used to implement the guidance.

7. A communication navigation system for performing navigation, using map data stored in a server and current position data about a navigation terminal, by transmitting the map data to the navigation terminal via a communication network, the communication navigation system comprising:

a navigation terminal which requests a server to transmit an information necessary for an immediate part of guidance via the communication network and sends a memory capacity of the navigation terminal to the server;

a server which divides information which is searched by the server form a starting point to a destination point specified by a user, into some segments judged by the server according to the terminal memory and transmits the requested divided information which is the closest oint information to the navigation terminal, to the navigation terminal via the communication network, wherein the requested information is a map data which is updated at the time of the server receiving the navigation terminal requests.

8. The communication navigation system according to claim 7, wherein each of the information segments comprises route information indicative of a route.

9. The communication navigation system according to claim 7, wherein each of the information segments comprises guidance information used to implement the guidance.

10. A communication navigation system for implementing a communication navigation method for performing navigation, using map data stored in a server and current position data about a navigation terminal, by transmitting the map data to the navigation terminal via a communication network, the communication navigation method comprising:

a first procedure in which the navigation terminal requests the server to transmit an information segment necessary for a first current part of guidance via the communication network and sends a memory capacity of the navigation terminal to the server;

a second procedure in which the server transmits to the navigation terminal the first information segment of the information segments, which are map data from a starting point to a destination point specified by a user and searched by the server, which is divided into some segments judged by the server according to the terminal memory, via the communication network;

a third procedure in which after the second procedure, the navigation terminal requests the server to transmit a next one of the information segments necessary for a second current part of the guidance via the communication network; and a fourth procedure in which the server transmits to the navigation terminal the information segment requested by the third procedure, via the communication network, wherein the information segment transmitted by the fourth procedure is an update segment of the information segments at the time of the third procedure.

11. The communication navigation system according to claim 10, wherein each of the information segments comprises route information indicative of a route.

12. The communication navigation system according to claim 10, wherein each of the information segments comprises guidance information used to implement the guidance.

13. A terminal unit hat implements a communication navigation method for performing navigation, using map data stored in a server and current position data about a navigation terminal, by transmitting the map data to the navigation terminal via a communication network, as the navigation terminal, the communication navigation method comprising:

a requesting process in which the navigation terminal requests the server to transmit an information necessary for an immediate part of guidance via the communication network and sends a memory capacity of the navigation terminal to the server;

a dividing process in which an information which is searched by the server from a starting point to a destination point specified by a use, is divided into some segments judged by the server according to the terminal memory: and a transmitting process in which the server transmits the requested divided information which is the closest point information to the navigation terminal, to the navigation terminal via the communication network, wherein the requested information is a map data which is updated at the time of the server receiving the terminal requests.

14. The terminal unit according to claim 13, wherein each of the information segments comprises route information indicative of a route.

15. The terminal unit according to claim 13, wherein each of the information segments comprises guidance information used to implement the guidance.

16. A terminal unit that implements a communication navigation method for performing navigation, using map data stored in a server and current position data about a navigation terminal, by transmitting the map data to the navigation terminal via a communication network, as the navigation terminal, the communication navigation method comprising:

a first procedure in which the navigation terminal requests the server to transmit an information segment necessary for a first current part of guidance via the communication network and sends a memory capacity of the navigation terminal to the server;

a second procedure in which the server transmits to the navigation terminal the first information segment of the information segments, which are map data from a starting point to a destination point specified by a user and searched by the server, which is divided into some segments judged by the server according to the terminal memory, via the communication network;

a third procedure in which after the second procedure, the navigation terminal requests the server to transmit a next one of the information segments necessary for a second current part of the guidance via the communication network; and a fourth procedure in which the server transmits to the navigation terminal the information segment requested by the third procedure, via the communication network, wherein the information segment transmitted by the fourth procedure is an update segment of the information segments at the time of the third procedure.

17. The terminal unit according to claim 16, wherein each of the information segments comprises route information indicative of a route.

18. The terminal unit according to claim 16, wherein each of the information segments comprises guidance information used to implement the guidance.

19. A navigation terminal unit that implements a communication navigation method for performing navigation, using map data stored in a server and current position data about a navigation terminal, by transmitting the map data to the navigation terminal via a communication network, wherein the server transmits a requested divided information which is the closest point information to the navigation terminal from the navigation terminal to the navigation terminal via the communication network, and the navigation terminal requests the server to transmit an information necessary for an immediate part of guidance via the communication network and sends a memory capacity of the navigation terminal to the server.

20. The terminal unit according to claim 19, wherein each of the information segments comprises route information indicative of a route.

21. The terminal unit according to claim 19, wherein each of the information segments comprises guidance information used to implement the guidance.

* * * * *